United States Patent [19]
Anderson et al.

[11] Patent Number: 5,436,896
[45] Date of Patent: Jul. 25, 1995

[54] CONFERENCE BRIDGE FOR PACKETIZED SPEECH-SIGNAL NETWORKS

[75] Inventors: Thomas W. Anderson, Naperville; Norman R. Tiedemann, Bolingbrook, both of Ill.; Paul W. Vancil, Austin, Tex.

[73] Assignee: AT&T Corp., Murray Hill, N.J.

[21] Appl. No.: 214,724

[22] Filed: Mar. 17, 1994

[51] Int. Cl.⁶ .......................................... H04Q 11/04
[52] U.S. Cl. .................................................. 370/62
[58] Field of Search ................ 370/62, 94.1, 32.1, 370/85.13; 379/201, 202, 204, 158, 159, 406, 390

[56] References Cited

U.S. PATENT DOCUMENTS

| | | | |
|---|---|---|---|
| 4,022,981 | 5/1977 | McLaughlin et al. | 370/62 |
| 4,475,189 | 10/1984 | Herr et al. | 370/62 |
| 4,475,190 | 10/1984 | Marouf et al. | 370/62 |
| 4,479,211 | 10/1984 | Bass et al. | 370/62 |
| 4,499,578 | 2/1985 | Marouf et al. | 370/62 |
| 4,937,856 | 6/1990 | Natarajan | 379/158 |

*Primary Examiner*—Douglas W. Olms
*Assistant Examiner*—Shick Hom
*Attorney, Agent, or Firm*—Michael B. Johannesen

[57] ABSTRACT

A conference bridge that receives speech data in the form of data packets, and transmits data in the same form, without transforming the data in the conference bridge. The conference bridge according to this invention includes a plurality of inputs that have speech detectors that detect the presence of speech data. The speech detectors report the presence of speech to a controller. The controller causes data packets from one of the inputs detecting speech to be replicated for all outputs. If there is speech at more than one input at a time, then a decision is made as to which input to replicate. Advantageously, the decision is based on who is the loudest speaker. Further, the data that is replicated is not sent to the output for the originator in order to prevent echo.

8 Claims, 4 Drawing Sheets

CONFERENCE BRIDGE FOR PACKETIZED SPEECH-SIGNAL NETWORKS

TECHNICAL FIELD

This invention relates to the field of audio conference bridges, and, more specifically, to the area of providing a conference bridge for networks where speech signals be transmitted as data packets.

BACKGROUND OF THE INVENTION

Conference calls are a popular means for having a meeting among a geographically diverse group of participants without having to expend the time and money necessary to meet in person. A conference call is a telephonic connection among a number of participants in diverse locations communicating on full-duplex circuits. A telephone system that can provide conference calls requires special hardware, called a "conference bridge."

FIG. 1 shows a typical conference bridge of the prior art. For purposes of describing the prior art, a digital conference bridge of the type used in long-distance service is shown. Such conference bridges operate in an environment where voice signals are digitally encoded into a 64 Kbps data stream. Conference bridge 10 interconnects a plurality of participants 1-N to each other, so that each participant may speak and be heard by all of the other participants, and may hear all of the other participants. To this end, conference bridge 10 has a plurality of inputs 12 and a plurality of outputs 14, one of each for each participant. For the purpose of illustrating FIG. 1, inputs 12 are shown on the left side of the drawing and outputs 14 am on the right. In reality, an input and output pair go to each of the participants.

Each input 12 is connected to a speech detector 16 which detects speech on the input by sampling the 64 Kbps data stream and determining the amount of energy present over a given time. If the energy exceeds a predetermined threshold, and is greater than the worst case estimated echo, then it is presumed that the signal contains speech. Each speech detector 16 controls a switch 18, so that switch 18 is closed when speech is detected, thus allowing the speech to pass. If the energy in the data stream is not above the predetermined threshold, then the signal is presumed to contain background noise. When no speech is detected, switch 18 is open, which reduces unwanted background noise from non-speakers, and thus increases the clarity of the speech signal delivered to the participants. An automatic gain control (AGC) device 19 is connected between speech detector 16 tap and switch 18, in order to provide a normalization of the volume (gain) of speech across all inputs 12. Speech detector 16 provides AGC 19 with a positive or negative value, which is added by AGC 19 to the signal on input 12.

Speech signals that pass through switch 18 are then mixed at summing amplifier 20, which sums the various speech signals and amplifies them for distribution. The combined signals are delivered to distributor 22, which sends the combined signals to all outputs 14. The combined signals are received at subtractors 24, which subtracts the incoming speech (if any) from the specific participant, in order to prevent that participant from hearing echo of his own voice on the line.

A further source of echo, which is well known in the art, is echo of a speech signal reflecting from a hybrid at the far end. In a conference bridge of FIG. 1, such echo is a major problem, because echo is coming in on N inputs 12, is amplified at AGC 19 and summing amplifier 20, and is then sent back to all participants on outputs 14. Thus, any echo is amplified N−1 times, creating intolerable noise levels. As a result, a further echo canceler circuit 26 is added to each input/output pair, with additional circuitry to reduce echo. Echo canceler 26 taps output 14 after subtractor 24 (so that any previous source of echo has been eliminated) and feeds the speech signal to a canceling circuit 28. Canceling circuit 28 estimates the amount and the time delay of echo and causes this amount to be subtracted from the signal on input 12 at subtractor 30. There is one echo canceler 26 per input/output pair, even though only one is shown (on input/output N) for clarity.

Conference bridges of this type work well for standard digital conference calls. There is, however, a new method for transporting telecommunications, which is to packetize a digital speech signal and transport the packets. One example of such packetization is asynchronous transfer mode (ATM). ATM cells encapsulate digitized speech and are sent at a high rate of speed over a self-routing ATM network. An obvious solution to the problem of providing a conference bridge for an ATM communications network is to remove the communications data from each ATM cell at an ATM-to-network converter, shown in phantom at 32 on inputs 12 (FIG. 1), perform the conferencing function as before, and re-encapsulate the communications data at a network-to-ATM converter, shown in phantom at 34 on outputs 14. Such a system would inevitably be slow and cumbersome, since every time communications form is converted, the communication is slowed due to packetization delay.

A problem in the art is that there is no conference bridge in the prior art that can support packetized speech signal transmission without conversion of the packet stream, causing packet delay.

SUMMARY OF THE INVENTION

This problem is solved and a technical advance is achieved in that art by a system and method for providing a conference bridge for a packet network that processes packets in their encapsulated form without changing the mode of the data, thus conserving the time it takes to transform data and preserving data integrity. A conference bridge according to this invention receives data in the form of packets, advantageously in ATM cells, and transmits data in the same form, without transforming the data within the conference bridge. A conference bridge according to this invention includes a plurality of inputs that have speech detectors that detect the presence of speech, i.e., data packets presumed to represent speech. The speech detectors report the presence of speech to a controller based on detection of packets. The controller causes these data packets at an input to be replicated. If there is speech at more than one input at the same time, then a decision is made as to which input to replicate. Advantageously, the replication decision may be based on which input has the loudest speaker. The replicated data is then sent to the outputs. Advantageously, the replicated data is not sent to the output corresponding to the input being replicated in order to prevent echo to that participant.

BRIEF DESCRIPTION OF THE DRAWING

A more complete understanding of the invention may be obtained from a consideration of the following description in conjunction with the drawings, in which.

DETAILED DESCRIPTION

Figure 2:
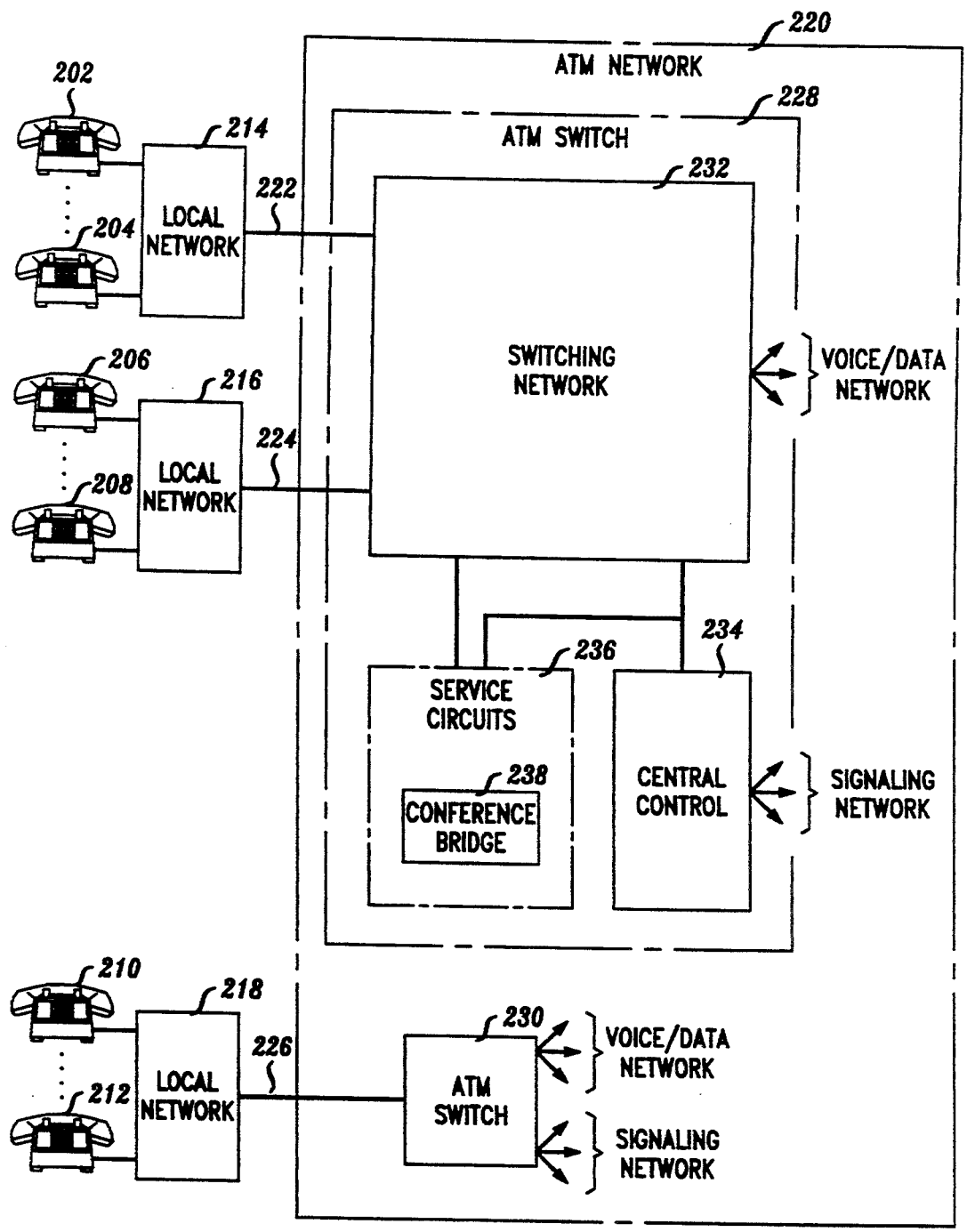
FIG. 2 is a block diagram of a switching network in which an exemplary embodiment of this invention may operate.

FIG. 2 is a block diagram of a switching network which illustrates the context of an exemplary embodiment of this invention. For purposes of describing the exemplary embodiment of this invention, there is a plurality of conference call participants at a plurality of telephones 202-212. Telephones 202 and 204 are connected to local network 214, telephones 206 and 208 are connected to local network 216, and telephones 210 and 212 are connected to local network 218. Local networks include, as is known in the art, one or more local switches. Local networks 214, 216 and 218 convert the voice signals into/out of packetized ATM cell format and the converted signals are transmitted over a long distance network, comprising an asynchronous transfer mode (ATM) network 220, via ATM links 222, 224, and 226, respectively.

Local networks 214 and 216 are connected to ATM network 220 at ATM switch 228. Local network 218 is connected to ATM network 220 at ATM switch 230. Both ATM switches 228 and 230 are connected to each other and to other ATM switches in ATM network 230 via a signaling network and a voice/data network, as is known in the art. Alternatively, ATM voice/data network may also carry signaling communications among ATM switches.

ATM switch 228 comprises switching network 232, which is connected to local networks 214 and 216 via ATM links 222 and 224, as mentioned above, to other ATM switches (e.g., ATM switch 230) and other local networks (not shown for clarity). ATM switch 228 also comprises a central control 234, which controls the actions of switching network 232, in order to switch calls.

ATM switch 228 also includes service circuits 236, which provide features and services for the switch, as is known in the art. One of the services provided in service circuit 236 is conferencing at conference bridges 238. According to the exemplary embodiment of this invention, conference bridge 238 provides a conference circuit so that participants at telephones 202-212 may all participate in a conference call at the same time.

A conference call may be set up among the participants at telephones 202-212 in any of the manners currently known in the art. For example, the participant at telephone 202 may call an operator and give the number of participants who will be participating in the call and the time when the call is to be set up. The operator may then obtain the telephone numbers of telephones 204-212, place a call to each of the participants at the desired time, and connect them to conference bridge 238. Alternatively, the operator may give the participant at telephone 202 a specific telephone number of conference bridge 238 which all of the participants may then dial at a prearranged time. A further method to arrange a conference call is for the participant at telephone 202 to dial a special number (for example, an "800" number) wherein that participant is connected to an automatic system for setting up conference calls. The participant at telephone 202 enters the number of parties on the conference call (in this case, five additional parties). If there are five ports available at the conference circuit, then the call is allowed. Otherwise, the participant at telephone 202 is asked to try the conference call later. If there are enough ports available, then the participant at telephone 202 dials the numbers of telephones 204-212 which are connected together at conference bridge 238.

Figure 3:
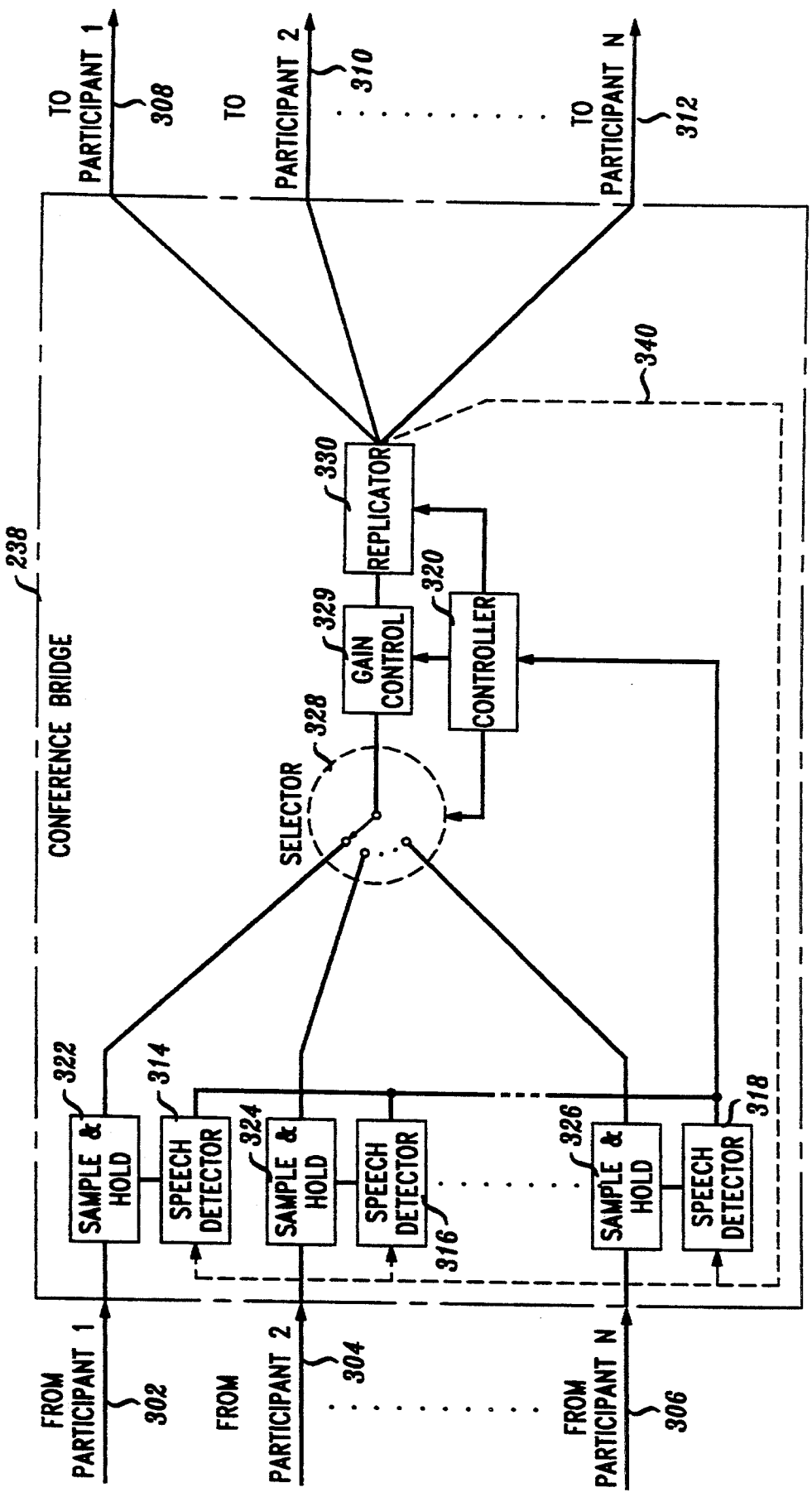
FIG. 3 is a block diagram of an exemplary embodiment of this invention.

Turning now to FIG. 3, a block diagram of conference bridge 238, FIG. 2, is shown. Conference bridge 238 comprises a plurality of inputs 302-306, one from each of the participants, and a plurality of outputs 308-312, one to each of the participants. Inputs 302-306 and outputs 308-312 are illustrated as being on opposite sides of conference bridge 238. In reality, these are pairs of communications channels coming from and going to the same participant. For example, input 302 and output 308 are both connected to a single participant which may be, for example, at telephone 202 in FIG. 2.

At each input, them is a speech detector 314-318. Speech detectors 314-318 monitor their respective inputs for speech signals. Sample and hold buffers 322-326 accumulate data for speech detectors 314-318. Speech detectors 314-318 analyze the speech data in the ATM cells by aggregating the data from a plurality of cells at sample and hold buffers 322-326 and determining the total energy in the speech data. If the energy is above a predetermined threshold, then speech is assumed to be present. According to the exemplary embodiment, speech detectors 314-318 report detected speech and/or volume (relative quantity of energy) of detected speech to controller 320.

Controller 320 receives the output of speech detector 314-318 and determines which of the plurality of participants is speaking at a given time by comparing the energy of detected speech signals to a threshold. If only one of the plurality of participants is speaking, then controller 320 causes selector 322 to receive data from the sample and hold buffer associated with that input. For example, if participant 1 were the only participant speaking, speech detector 314 informs controller 320 of the detected speech, and controller 320 sets selector 328 to read data from sample and hold buffer 322 of input 302.

Figure 1:
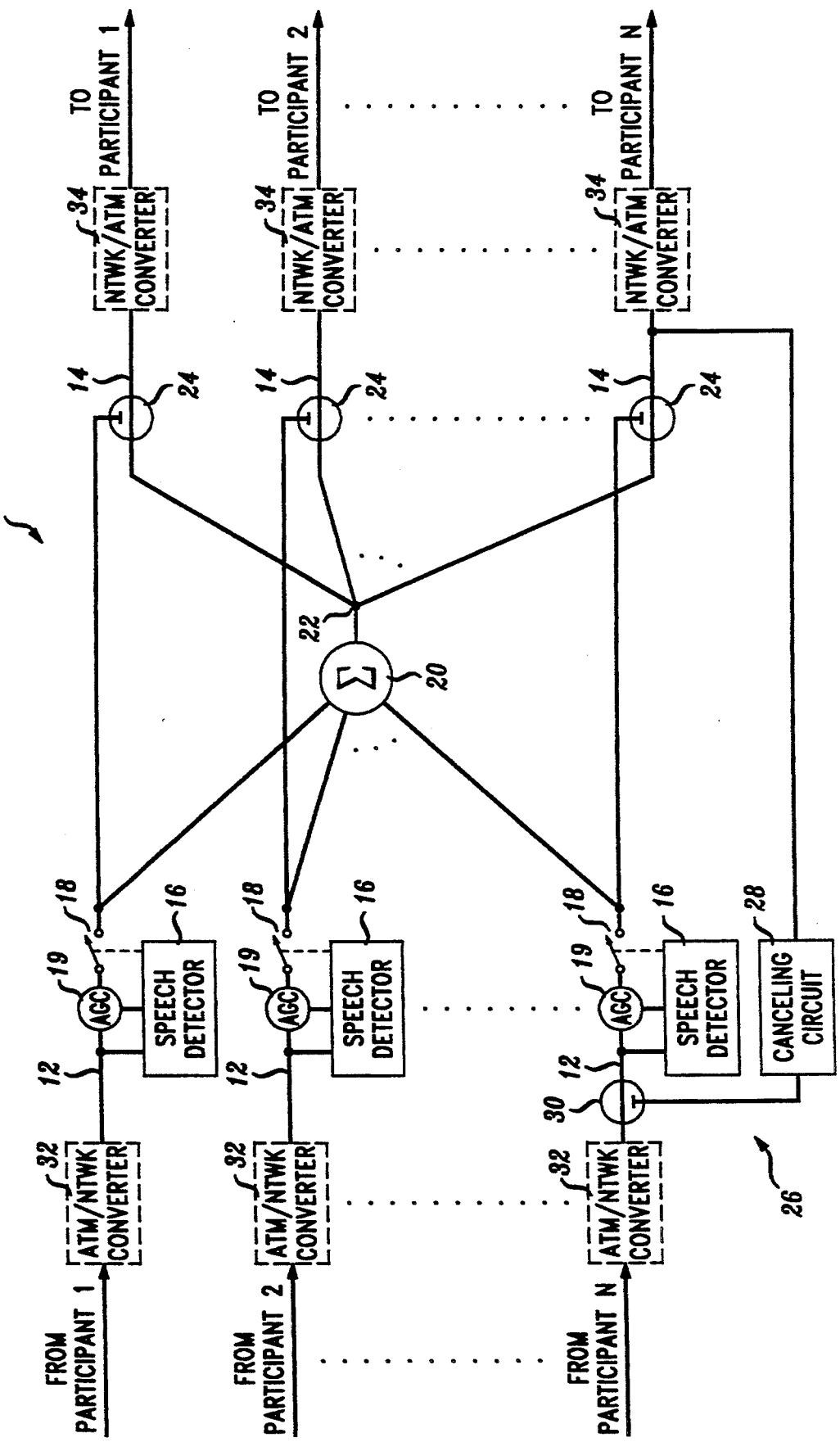
FIG. 1 is a block diagram of a prior art conference bridge for a long-distance switching network.

Data is moved from selector 328 into automatic gain control circuit 329. Controller 320 uses the energy (volume) detected by the speech detector for the selected input to determine a value to be added to or subtracted from the signal in order to equalize (normalize) the volume of the output. In this invention, gain control is more easily obtained than in the prior art (FIG. 1), as there is only one place where automatic gain control is necessary (after selector 328) because only one input is selected at a given time. Thus, a conference bridge according to this invention is simpler to build than the prior art.

Data is then sent to replicator 330, which replicates the data in the ATM (or other digital) cell selected by selector 328 for as many outputs as there are participants, except for the speaker. In this example, where participant 1 is speaking, replicator 330 replicates the ATM cells for outputs 310-312 for the other participants. By not sending the speech signal to the speaker, conference bridge 238 prevents one of the two echo problems in the prior art without feed back or feed forward circuits and subtractors.

If more than one person is talking at the same time, as detected by speech detectors 314-318, controller 320 causes the loudest (highest energy level) speaker to be replicated at selector 328 and replicated at replicator 330. Since the delay characteristics of selector 328 and replicator 330 are very low, the other participant or participants speaking can be selected during the next selection period, thus giving the impression of simultaneous speakers. By scanning speech detectors 314-326 and reconfiguring selector 328 at an appropriate interval (e.g., 6 milliseconds per cell, which provides minimal speech clipping) the effect of simultaneous talkers can be achieved by such multiplexing without summing voice samples. Furthermore, superior noise and echo control are achieved and delay is minimized because the bridge is passing data for only one person at a time. Echo cancellation circuits like those at 26 (FIG. 1) are not needed because there is only one voice signal at any time, which is what the network expects, and the network is already set up to cancel echo for a two party connection. Thus, this invention provides simplification in both components and complexity over the prior art. In applications where echo is not canceled at the edges of the network (as in some non-ATM applications), line 340 (shown in phantom) provides a copy of the outgoing signal to speech detectors 314-318. Speech detectors 314-318 use this information to estimate echo that might be on inputs 302-306 so that they may accurately determine whether or not speech is present.

Figure 4:
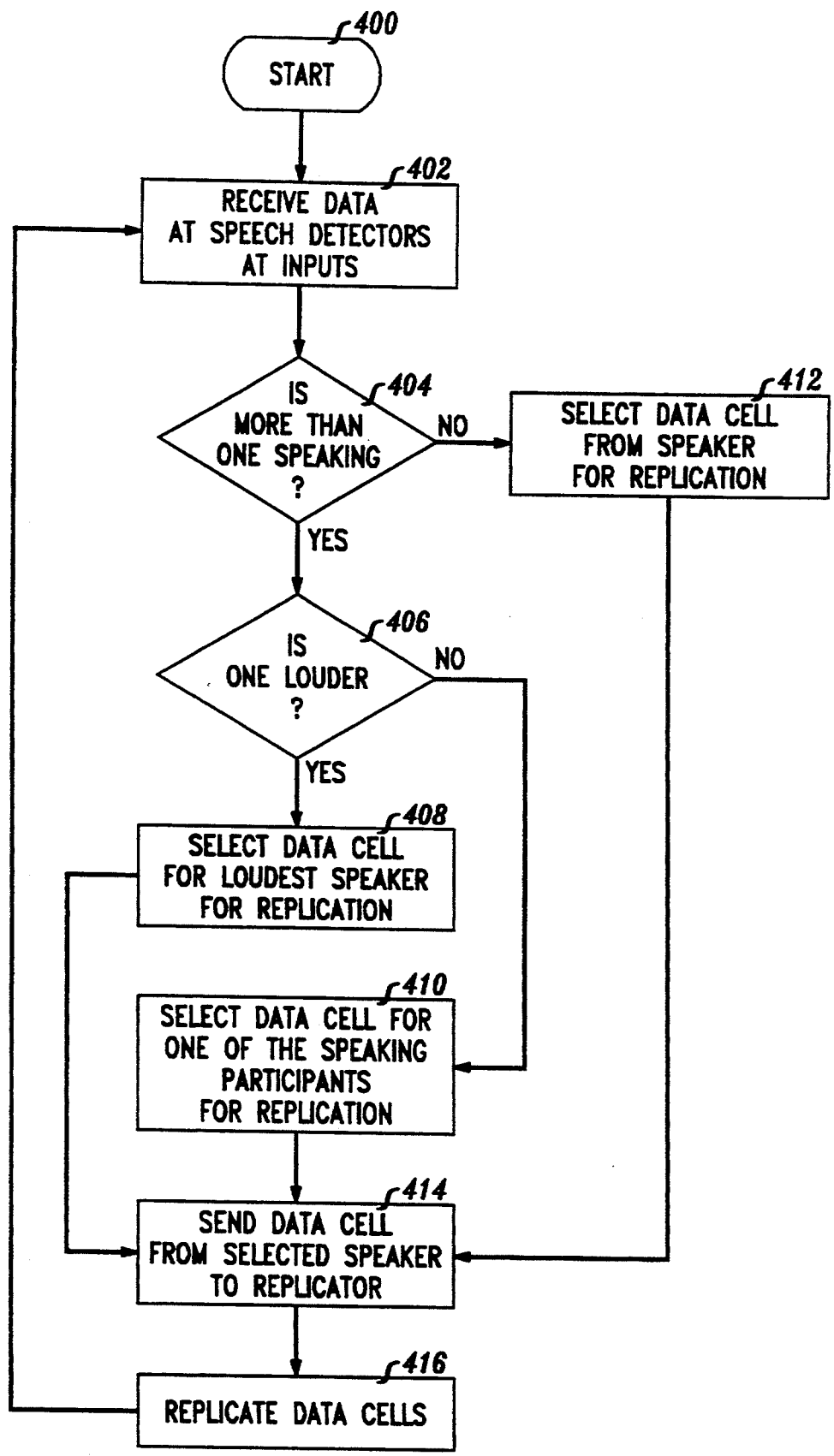
FIG. 4 is a flow chart of the operation of the device of FIG. 3.

Turning now to FIG. 4 a flow chart of the operation of conference bridge 238 (FIG. 3) is illustrated. Processing starts at circle 400 and proceeds to action box 402. In action box 402, data is received at the speech detectors on the inputs and the speech detectors report to the controller whether or not they detect speech. Processing continues to decision diamond 404, where the controller decides if more than one participant is speaking. If there is more than one participant speaking, then processing continues to decision diamond 406, where a determination is made whether one speaker is louder than the others. If one is louder, then processing continues to action box 408 where the cell for the loudest speaker is selected for replication. If, in decision diamond 406 all speakers are approximately equally loud, then processing moves to action box 410, where packets containing data representing speech for one of the simultaneous speakers is selected and sent to the replicator.

If, in decision diamond 404 only one participant were speaking, then processing continues to action box 412, where a dam cell for the speaker is selected for replication. Processing continues from action boxes 408, 410 and 412 to action box 414, where a data cell from the selected speaker is sent to the replicator. Processing continues in action box 416 where the replicator replicates data packets for the selected speaker and sends the replicated data cells to the outputs going to the participants (except for the selected speaker). Processing continues back to action box 402. Processing continues in this manner until the conference bridge is deactivated by central control 234 of FIG. 2.

It is to be understood that the above-described embodiments are merely illustrative principles of the invention, and that many variations may be devised by those skilled in the art without departing from the scope of the invention. It is, therefore, intended that such variations be included within the scope of the claims.

We claim:

1. A conference bridge apparatus for a packet network, said conference bridge receiving input communications in the form of data packets from a plurality of participants and distributing said data packets to said plurality of participants, said apparatus comprising:
    a plurality of inputs, one of said plurality of inputs being connected to each of said plurality of participants, each of said plurality of inputs having a speech detection means for generating indications of the presence of data packets representing speech at its input;
    a plurality of outputs, one of said plurality of outputs connected to each of said participants;
    replicating means connected to said plurality of inputs and said plurality of outputs for receiving data packets from only one of said inputs, for replicating said received data packets; and
    selector means connected to said plurality of speech detection means and said replicating means for comparing said indications from each of said speech detection means to determine which input has a speech signal and for causing said replicating means to replicate data packets from said input having a speech signal and send said replicated packets to ones of said plurality of outputs.

2. A conference bridge apparatus according to claim 1 wherein said replication means includes means for not sending packets from said input having a speech signal to an output related to said input having a speech signal.

3. A conference bridge apparatus according to claim 1 wherein said network comprises an asynchronous transfer mode network.

4. A method for use in a conference bridge in a data network, said conference bridge including a plurality of inputs connected to a plurality of participants, a plurality of speech detectors for detecting the presence of speech data at each of said plurality of inputs and generating an indication when speech is detected, a plurality of outputs connected to said plurality of participants, replicating means connected to said plurality of inputs and said plurality of outputs for receiving data packets containing said speech data from said inputs, replicating said data packets and sending them to said plurality of outputs, and selector means connected to said plurality of speech detectors and said replicating means for controlling said replicating means, said method comprising the steps of:
    said selector means determining which of said plurality of inputs has a speech indication from ones of said plurality of speech detectors;
    said selector means causing said replicating means to replicate data packets from said input having a speech signal; and
    said replicating means sending said data packets to said plurality of outputs.

5. A method for use in a conference bridge according to claim 4 wherein said replicating means does not send said replicated data packets to an output related to said input having a speech signal.

6. A method for use in a conference bridge according to claim 4 wherein said step of determining which of said plurality of inputs has a speech indication comprises determining which of said speech indications are the loudest.

7. A method for use in a conference bridge according to claim 4 wherein said controller means causes said replicating means to replicate data packets from only one input at a time.

8. A conference bridge apparatus according to claim 1 further including an automatic gain control connected to said replicating means for controlling the gain of said data packets from said input having a speech signal before said data packets are replicated.

* * * * *